United States Patent
Cohen et al.

(10) Patent No.: US 7,249,346 B2
(45) Date of Patent: Jul. 24, 2007

(54) NON-FORGEABLE OBJECTS IN AN OBJECT SYSTEM

(75) Inventors: Richard M. Cohen, Austin, TX (US); William H. Vollers, Austin, TX (US)

(73) Assignee: Electronic Data Systems Corporation, Plano, TX (US)

( * ) Notice: Subject to any disclaimer, the term of this patent is extended or adjusted under 35 U.S.C. 154(b) by 845 days.

(21) Appl. No.: 10/427,190

(22) Filed: Apr. 30, 2003

(65) Prior Publication Data

US 2004/0221266 A1 Nov. 4, 2004

(51) Int. Cl.
*G06F 9/44* (2006.01)

(52) U.S. Cl. .................... 717/108; 717/104; 717/106; 717/165

(58) Field of Classification Search ........ 717/101–115; 715/762; 707/103 R
See application file for complete search history.

(56) References Cited

U.S. PATENT DOCUMENTS

| | | | | |
|---|---|---|---|---|
| 5,822,580 | A * | 10/1998 | Leung | 707/103 R |
| 6,496,202 | B1 * | 12/2002 | Prinzing | 715/762 |
| 2004/0003371 | A1 * | 1/2004 | Coulthard et al. | 717/101 |
| 2005/0278697 | A1 * | 12/2005 | Hodge | 717/115 |

* cited by examiner

*Primary Examiner*—Kakali Chaki
*Assistant Examiner*—Mark P. Francis
(74) *Attorney, Agent, or Firm*—Stephen R. Loe (57) ABSTRACT

A method, system, and computer program product for defining a non-forgeable object is provided. In one embodiment, a non-forgeable object class is defined to include an attribute slot that can be set by an approved factory. The non-forgeable object class is further defined to include a predicate method that is satisfied only if the attribute slot has been set by an approved factory.

18 Claims, 6 Drawing Sheets

```
public class ObjectFactory {
    //Define a trusted object factory method.
    public NonForgeableObject makeObject (...) {
        NonForgeableObject object = new NonForgeableObject (...) ;

// Mark the new instance of NonForgeableObject.
        Object.mark (new Marker());

return object;
    } public static class Marker {

// Because this constructor is "private", new instances
        // of this class can only be created by an ObjectFactory.
        private Marker() { }
    }
} public class NonForgeableObject {

//This slot is not accessible outside of this class.
    private ObjectFactory. Marker marker = null;

public NonForgeableObject (...) {
        //Intialize the object, leaving the marker slot as null.
        ...
    }

// This method is "final" and so cannot be overridden by subclasses.
    public final boolean isMarked () {
        return marker ! = null;
    }

//Only the ObjectFactory will call this method with a non-null
    // Marker value, because no other class (except this one) can
    // create or access a Marker value, and this class never calls
    // the mark method.

// This method is "final" and so cannot be overridden by subclasses.
    public final void mark (ObjectFactory.Marker mark) {
        marker = mark;
    }
}
```

FIG. 5

NON-FORGEABLE OBJECTS IN AN OBJECT SYSTEM

The U.S. Government has a paid-up license in this invention and the right in limited circumstances to require the patent owner to license others on reasonable terms as provided for by the terms of contract number GS-35F-0323J awarded by the Defense Manpower Data Center

BACKGROUND OF THE INVENTION

1. Technical Field

The present invention relates generally to the field of computer software and, more specifically, to object oriented systems.

2. Description of Related Art

Computers have come to permeate all aspects of society since the introduction of the personal computer over twenty years ago. During this time, computers and computer programming languages have evolved to allow greater control of and manipulation of information. Originally, most software was written in unstructured programming languages. Later, other programming languages developed, such as procedural and modular programming languages, that allowed programmer greater flexibility in creating software and allowed for the creation of more complex software that resulted in a greater simplicity of use for the end user. Currently, one of the more popular and powerful programming language types is object-oriented programming, such as, for example, Java and C++.

An object-oriented program is made up of objects. An object has an internal state (i.e. variables that are local to the object) and operations to modify that state. This is unlike previous programming systems, such as procedural and modular systems in which the software contained sub-procedures or modules called by a main routine, where the variables that are to be modified must be passed from one routine to the sub-routine in a predefined format and are globally modified. In the everyday world that most of us are familiar with, an example of an object is a car. It has an internal state consisting of 'amount of fuel', 'make of car', 'number of miles driven' and 'color' and it responds to the operations 'drive n miles', 'how many miles have you driven?' and 'respray with color c'. Similarly, software objects have an internal state. Where relevant, objects know how to display themselves on the screen and how to load and save themselves.

Every object is an instance of (i.e. belongs to) a class. In simple terms a class is just a template for the object. It contains details of all the behavior of an object along with what state information the object has (i.e. it has the code and data structure definitions). 'Car' is an example of a class. It describes what it is like to be a car but it isn't actually a car itself. To make a 'real' car you have to instantiate the class, and then you get an object such as Julie's car which is a green Ford or Fred's car which is a red Toyota.

The difference between object and class is like the difference between a car and its technical manual. The manual tells you everything you need to know about the car so that you can even go and build one, but you'll look pretty silly sitting in the manual and expecting it to transport you from your home to a store.

In an object-oriented system, instances of a class could be made from several different sources (i.e. object factories). However, in many circumstances, it may be desirable to distinguish instances made by a specific source from those made by other sources. For example, a system might wish to know if an object's state was initialized from a production database or from some other data source, such as, for example, a test driver, before processing that object. There may be many reasons why a system may wish to know this information ranging from security reasons, such as concerns over computer viruses, to simply knowing that the instance was made by a source specifically designed for this application. Therefore, it would be desirable to have a method, system, and computer program product that allows system components to be able to distinguish between object instances constructed by designated factories from instances create by other factories. That is, the "unapproved" factories cannot forge an object instance that appears to have been constructed by an "approved" factory.

SUMMARY OF THE INVENTION

The present invention provides a method, system, and computer program product for defining a non-forgeable object. In one embodiment, a non-forgeable object class is defined to include an attribute slot that can be set by an approved factory. The non-forgeable object class is further defined to include a predicate method that is satisfied only if the attribute slot has been set by an approved factory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
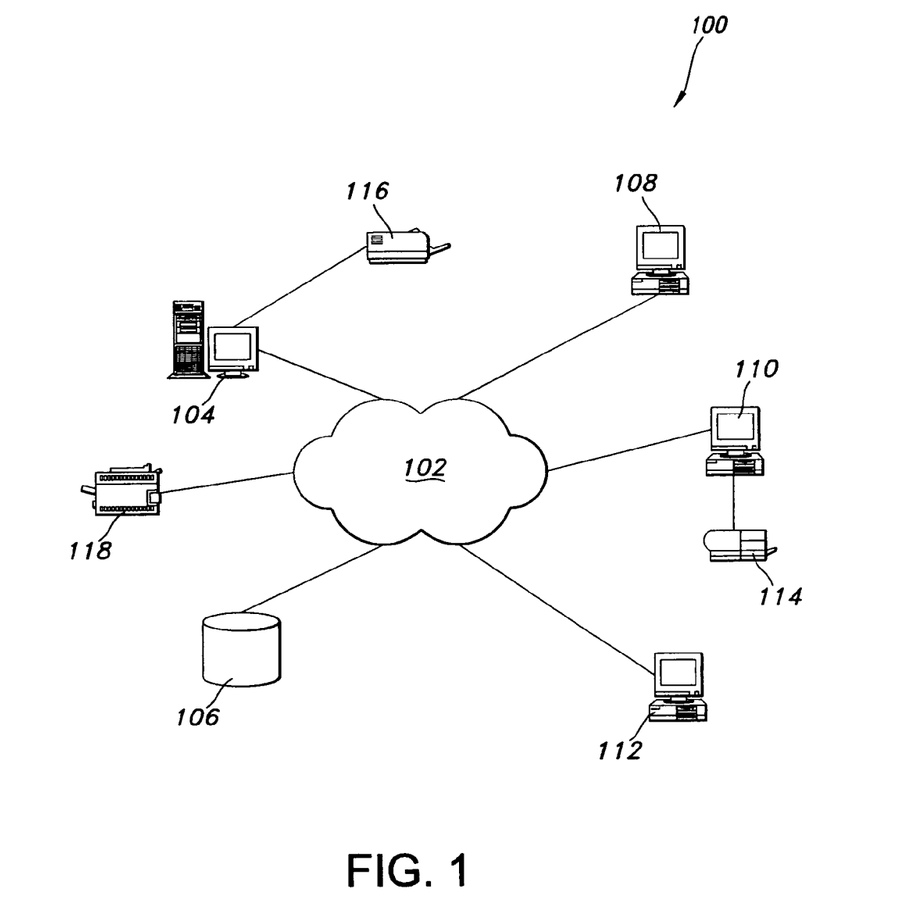
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100.

Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108-112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2A:
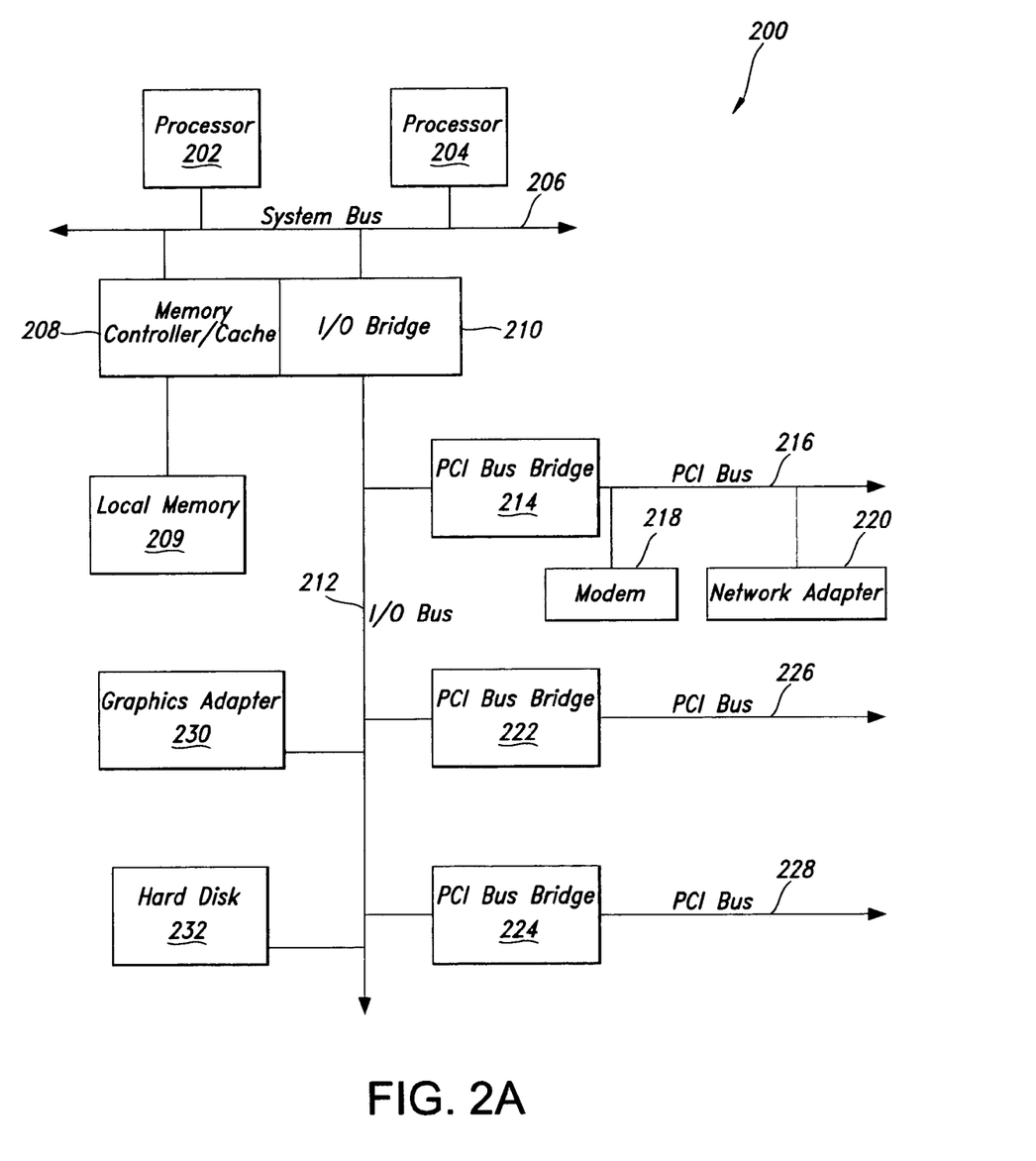
FIG. 2A depicts a block diagram of a data processing system which may be implemented as a server in accordance with the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
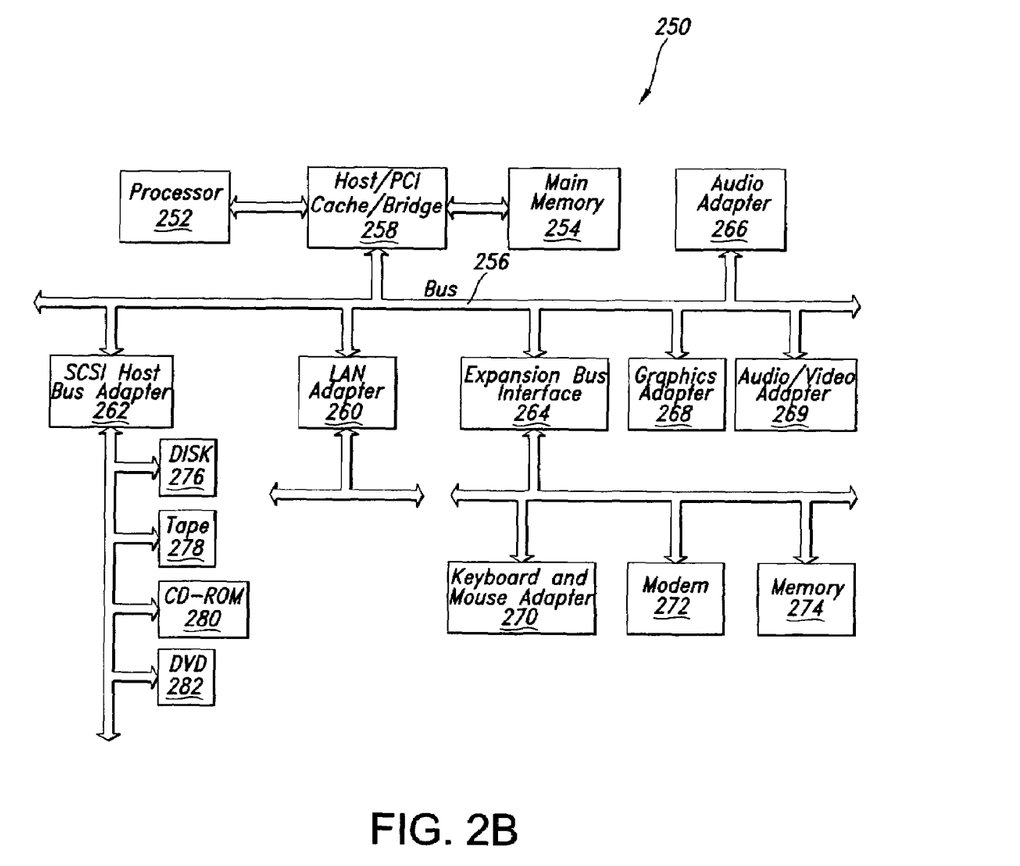
FIG. 2B depicts a block diagram of a data processing system in which the present invention may be implemented.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 23. The operating system may be a commercially available operating system such as JavaOS For Business☐ or OS/2☐, which are available from International Business Machines Corporation☐. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Java is a trademark of Sun Microsystems, Inc. of Santa Clara, Calif. Instructions for the operating system, the object-oriented operating system, and applications or programs are located on stotage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for creation of non-forgeable objects in an object system. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3A:
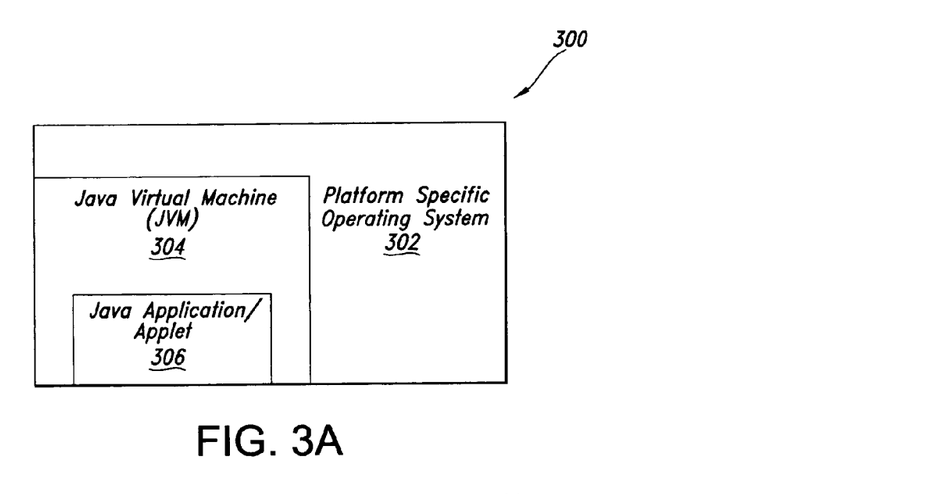
FIG. 3A depicts a block diagram illustrating the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
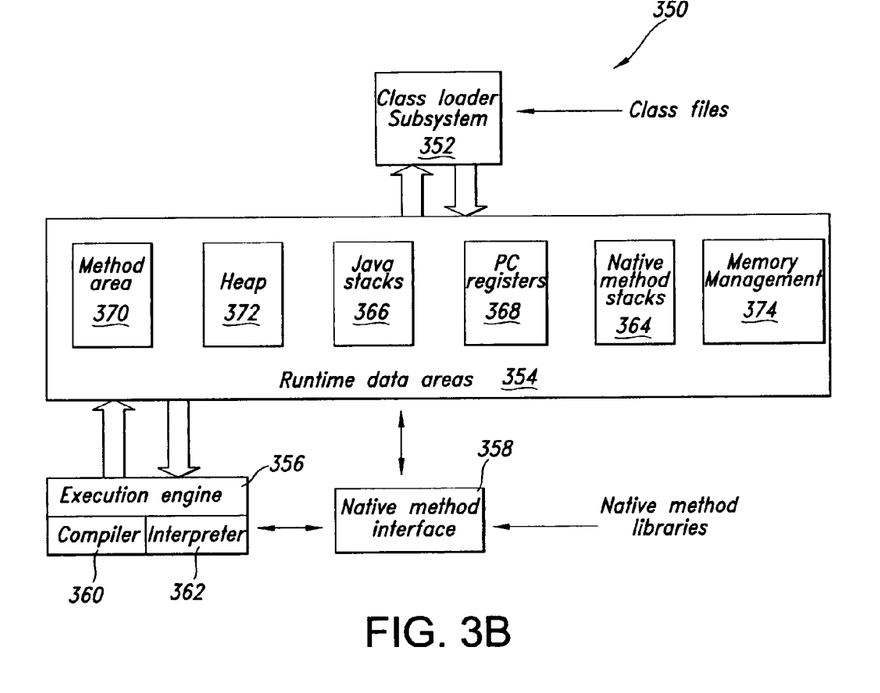
FIG. 3B depicts a block diagram of a JVM in accordance with an embodiment of the present invention.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread.

When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory. Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

Figure 4:
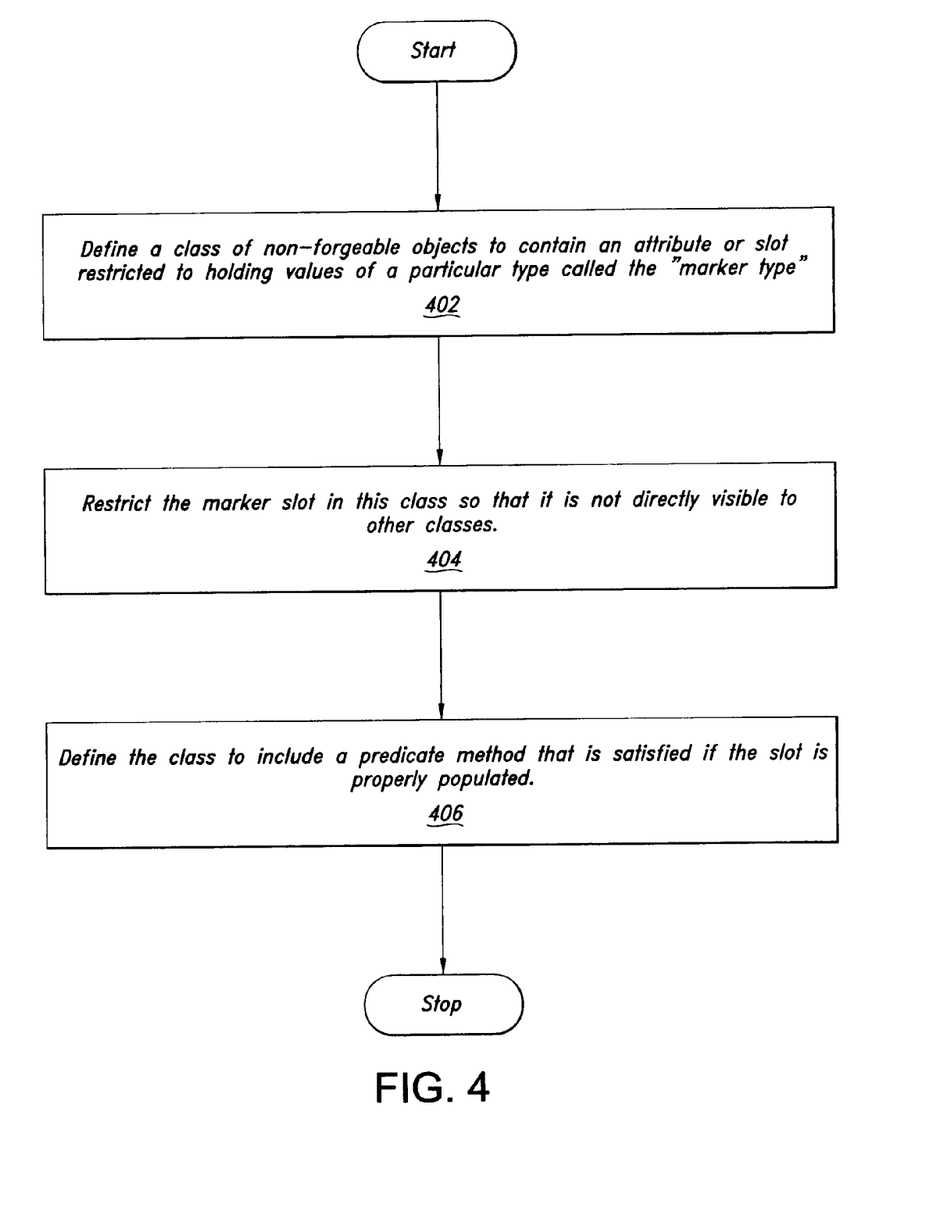
FIG. 4 depicts a flowchart illustrating an exemplary method for creating a non-forgeable object is depicted in accordance with the present invention.

With reference now to FIG. 4, a flowchart illustrating an exemplary method for creating a non-forgeable object is depicted in accordance with the present invention. The present invention provides that the non-forgeable object class contain an attribute or slot that can only be set by an approved factory. Restricting the slot so that it can only be set by an approved factory may be done directly with the access controls of the programming system, or may require some particular structure of classes to accomplish.

To define a class of non-forgeable objects, define the class to contain an attribute or slot restricted to holding values of a particular type called the "marker type" (step 402). An instance of this class is considered "authentic" if its marker slot is populated with an instance of the marker type. Restrict the marker slot in this class so that it is not directly visible to other classes (step 404). The slot can be set (via a setter method) to any object of the marker type, but there is no way to extract the contents of the marker slot from an instance.

Define the class to include a predicate method that is satisfied if the slot is properly populated (i.e., not null) (step 406). Creation of marker instances is restricted to the "approved" factories for the non-forgeable object class. If subclassing is allowed, the marker attribute must not be directly accessible by subclasses and subclasses may not override either the setter method or the predicate method of the non-forgeable class. These restrictions provide the following properties:

1.) Only the approved factories can create instances of the marker type.
2.) Once the marker slot of a non-forgeable instance is set, there is no method to allow access to the value of the marker slot.
3.) The value of the marker slot is inaccessible to methods defined in subclasses of the non-forgeable class.

Figure 5:
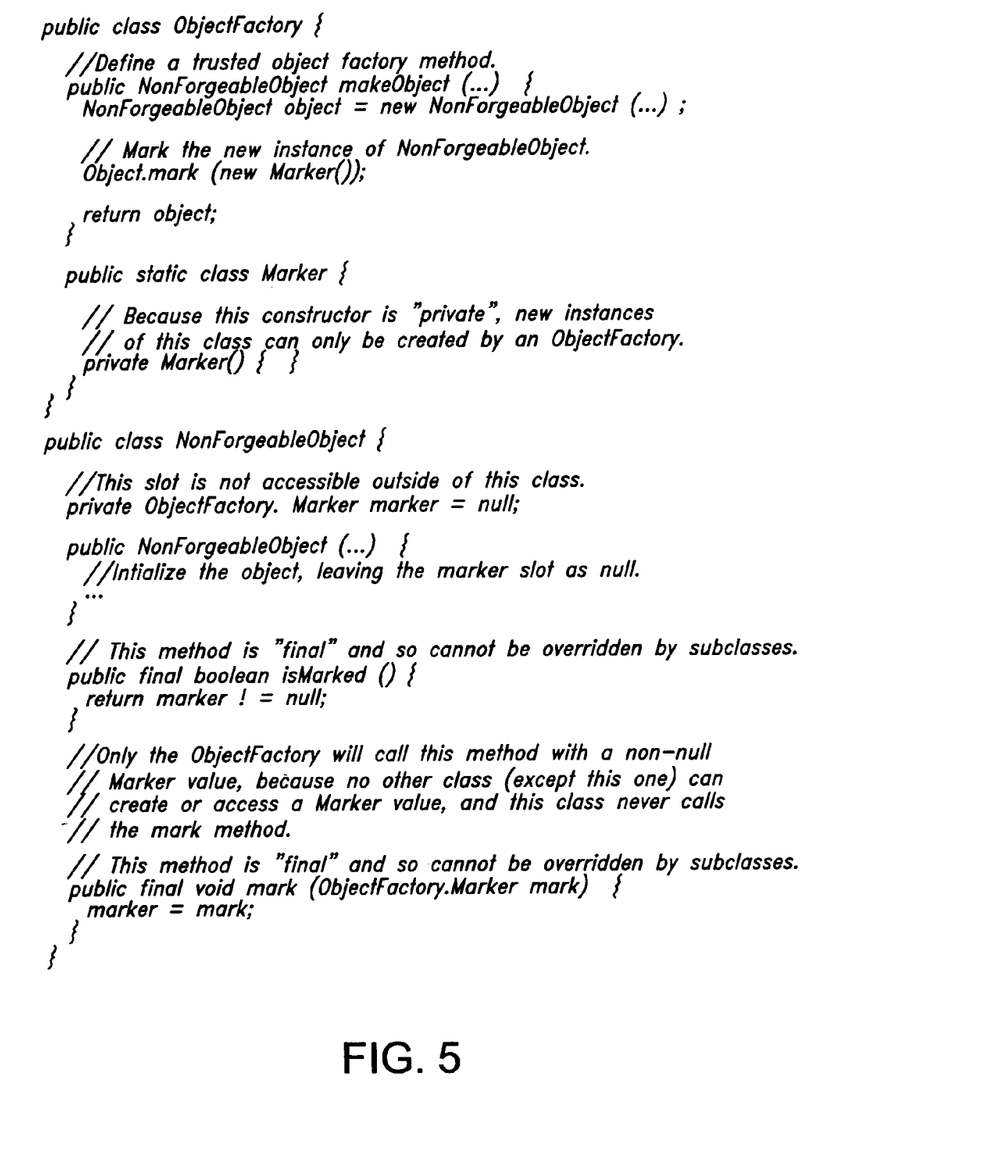
FIG. 5 depicts a sample of code fragments that describe one exemplary implementation of the present invention in the Java programming language.

Therefore, only approved factories can pass non-null marker instances to the setter method of a non-forgeable object. Thus, if an instance of the non-forgeable class has a non-null value in its marker slot, it is known that instance originated from an approved factory. A sample of code fragments that describe one exemplary implementation of the present invention in the Java programming language is depicted in FIG. 5.

An implementation of this solution can be made in any programming system that provides the following features:
1.) Ability to define a globally-visible marker class.
2.) Ability to have a marker slot in the non-forgeable object class that is not visible outside of that object class.
3.) Ability to prevent subclasses of the non-forgebable class from accessing the marker slot.
4.) Ability to enforce type-safety checks at runtime.

Furthermore, the restriction that only the trusted sources can authentically mark an object instance can be provided by either of the following two features:
5a.) Ability to restrict the creation of marker class instances to the trusted object source.
5b.) Ability to restrict the marking of an object instance to the trusted object source.

There are other possible implementations of the solution. For example, rather than have a marker slot in the non-forgeable class itself, the marker slot could be located in an envelope class, which also contains an instance of the non-forgeable class.

Note that some distributed object systems do not enforce the appropriate type-safety and data integrity across communication channels. For example, if the serialized representation of an object is sent across an unencrypted channel, a third party may be able to access the state of the object and alter it (e.g., insert a marker into a previously unauthenticated object). Such systems may not support implementations of the present invention.

Although the present invention has been described primarily with reference to the Java programming language, the present invention is not restricted to application within Java systems. The present invention is applicable to any object-oriented programming system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for defining a non-forgeable object comprising:
   defining an approved factory to define a non-forgeable object class to include a marker attribute slot restricted to holding marker type values by accessing the controls of the programming system;
   restricting the marker attribute slot so that it is not directly visible to other classes such that the contents of the marker slot may not be extracted from an instance of the object; and
   defining the non-forgeable object class to include a predicate method that is satisfied only if the attribute slot has been set by an approved factory;wherein only approved factories may pass nonnull marker instances to a setter method of the non-forgeable object.

2. The method recited in claim 1, wherein the attribute slot can only be set by an approved factory.

3. The method recited in claim 1, wherein only an approved factory can call the setter method or call a constructor for the non-forgeable object class that sets the attribute slot.

4. The method recited in claim 1, wherein only an approved factory can construct a non-null value accepted by the setter method for the slot.

5. The method recited in claim 4, wherein the value of the slot within a non-forgeable object is not visible outside of that object nor to methods defined outside of the non-forgeable object class.

6. The method recited in claim 1, wherein the predicate method cannot be overridden in the definition a subclass of the non-forgeable object class.

7. A computer program product in a computer readable storage media for use in a data processing system for defining a non-forgeable object comprising:
   first instructions for defining an approved factory to define a non-forgeable object class to include a marker attribute slot restricted to holding marker type values by accessing the controls of the programming system;
   second instructions for restricting the marker attribute slot so that it is not directly visible to other classes such that the contents of the marker slot may not be extracted from an instance of the object; and
   third instructions for defining the non-forgeable object class to include a predicate method that is satisfied only if the attribute slot has been set by an approved factory; wherein only approved factories may pass non-null marker instances to a setter method of the non-forgeable object.

8. The computer program product recited in claim 7, wherein the attribute slot can only be set by an approved factory.

9. The computer program product recited in claim 7, wherein only an approved factory can call the setter computer program product or call a constructor for the non-forgeable object class that sets the attribute slot.

10. The computer program product recited in claim 7, wherein only an approved factory can construct a non-null value accepted by the setter computer program product for the slot.

11. The computer program product recited in claim 10, wherein the value of the slot within a non-forgeable object is not visible outside of that object nor to computer program products defined outside of the non-forgeable object class.

12. The computer program product recited in claim 7, wherein the predicate computer program product cannot be overridden in the definition a subclass of the non-forgeable object class.

13. A system for defining a non-forgeable object comprising:
   first means for defining an approved factory to define a non-forgeable object class to include a marker attribute slot restricted to holding marker type values by accessing the controls of the programming system;
   second means for restricting the marker attribute slot so that it is not directly visible to other classes such that the contents of the marker slot may not be extracted from an instance of the object; and
   third means for defining the non-forgeable object class to include a predicate method that is satisfied only if the attribute slot has been set by an approved factory; wherein only approved factories may pass non-null marker instances to a setter method of the non-forgeable object.

14. The system recited in claim 13, wherein the attribute slot can only be set by an approved factory.

15. The system recited in claim 13, wherein only an approved factory can call the setter system or call a constructor for the non-forgeable object class that sets the attribute slot.

16. The system recited in claim 13, wherein only an approved factory can construct a non-null value accepted by the setter system for the slot.

17. The system recited in claim 16, wherein the value of the slot within a non-forgeable object is not visible outside of that object nor to systems defined outside of the non-forgeable object class.

18. The system recited in claim 13, wherein the predicate system cannot be overridden in the definition a subclass of the non-forgeable object class.

* * * * *